(12) United States Patent
Wang et al.

(10) Patent No.: US 7,053,330 B2
(45) Date of Patent: May 30, 2006

(54) PROJECTION WELD-BONDING SYSTEM AND METHOD

(75) Inventors: Pei-Chung Wang, Troy, MI (US); Robin Stevenson, Bloomfield, MI (US)

(73) Assignee: General Motors Corporation, Detroit, MI (US)

(*) Notice: Subject to any disclaimer, the term of this patent is extended or adjusted under 35 U.S.C. 154(b) by 160 days.

(21) Appl. No.: 10/779,514

(22) Filed: Feb. 13, 2004

(65) Prior Publication Data
US 2005/0178745 A1 Aug. 18, 2005

(51) Int. Cl.
*B23K 11/14* (2006.01)

(52) U.S. Cl. ..................................... 219/93

(58) Field of Classification Search ............. 219/92, 219/93, 94
See application file for complete search history.

(56) References Cited

U.S. PATENT DOCUMENTS

| | | | | |
|---|---|---|---|---|
| 3,576,963 A | * | 5/1971 | Vowels ..................... | 219/92 |
| 4,195,215 A | * | 3/1980 | Clarke ...................... | 219/91.21 |
| 4,901,135 A | * | 2/1990 | Costigan .................. | 257/710 |
| 5,030,816 A | * | 7/1991 | Strecker ................... | 219/91.2 |
| 5,332,281 A | | 7/1994 | Janotik et al. .............. | 296/209 |
| 5,473,133 A | * | 12/1995 | Peterson .................... | 219/93 |
| 5,645,738 A | | 7/1997 | Cecil ........................ | 219/110 |
| 5,782,575 A | | 7/1998 | Vincent et al. ............. | 403/270 |
| 5,818,008 A | | 10/1998 | Cecil ........................ | 219/110 |
| 5,848,853 A | | 12/1998 | Clenet ....................... | 403/272 |
| 5,883,354 A | * | 3/1999 | Elofson ..................... | 219/83 |
| 6,066,216 A | | 5/2000 | Ruppel, Jr. ................. | 156/73.1 |
| 6,176,544 B1 | | 1/2001 | Seksaria et al. ............ | 296/203.02 |
| 6,373,021 B1 | * | 4/2002 | Wang et al. ................ | 219/93 |
| 6,523,884 B1 | | 2/2003 | Czaplicki et al. ........... | 296/188 |
| 6,566,624 B1 | * | 5/2003 | Gabbianelli et al. ....... | 219/117.1 |
| 2002/0100746 A1 | | 8/2002 | Gabbianelli et al. ....... | 219/94 |
| 2002/0100747 A1 | | 8/2002 | Gabbianelli et al. ....... | 219/94 |
| 2002/0104830 A1 | | 8/2002 | Gabbianelli et al. ....... | 219/94 |
| 2002/0125739 A1 | | 9/2002 | Czaplicki et al. ........... | 296/187 |

FOREIGN PATENT DOCUMENTS

| JP | 59-193773 | * | 11/1984 |
|---|---|---|---|
| JP | 63-295072 | * | 12/1988 |
| JP | 5-285669 | * | 11/1993 |

* cited by examiner

*Primary Examiner*—Kevin P. Kerns
(74) *Attorney, Agent, or Firm*—Kathryn A. Marra

(57) ABSTRACT

A method of welding and a projection weld bond system is disclosed. A first workpiece is provided that is made of a material that conducts electricity, and a second workpeiece is provided that is made of a material that conducts electricity and has a plurality of projections formed therein. A materail is applied between each projections of plurality of projections, the material having electrical conductivity that is lower than the conductivity of the second workpiece. An area of the first workpiece is disposed at the plurality of projections of the second workpiece, and electricity is conducted through the first workpiece and through at least one of the plurality of projections of the second workpiece.

22 Claims, 2 Drawing Sheets

PROJECTION WELD-BONDING SYSTEM AND METHOD

BACKGROUND

Hydroformed tubes are attractive for automotive vehicles because they provide part consolidation and stiff structures. Hydroformed tubes are formed by placing the desired bends in the tube and forming the tube to the desired configuration. The process usually requires placing a tubular member having an open bore in a mold and sealing the ends of the tube. A pressurized liquid is then injected into the open bore, causing the tube to stretch and expand out against the mold.

In space-frame vehicle architecture, one hydroformed tube may need to be joined to another hydroformed tube. One joining method used to join one tube to another is welding one tube surface to another tube surface. However, the closed nature of hydroformed tubes imposes practical constraints when using conventional welding techniques, such as gas metal arc welding. Resistance welding is another type of welding that may be employed; however, when there are large contact surfaces (as there is with the hydroformed tubes), a very large current is required to generate enough heat to form a weld through resistance welding. In turn, the large current mandates a large transformer. Thus, resistance welding becomes an impractical method of welding hydroformed tubes.

BRIEF SUMMARY

Disclosed herein is a method of welding including: providing a first workpiece that is made of a material that conducts electricity; providing a second workpiece that is made of a material that conducts electricity and has a plurality of projections formed therein; applying a material between each projection of the plurality of projections, the material having an electrical conductivity that is lower than the conductivity of the second workpiece; disposing an area of the first workpiece at the plurality of projections of the second workpiece; and conducting electricity through the first workpiece and through at least one of the plurality of projections of the second workpiece. A projection weld bond system includes: a first workpiece that is made of a material that conducts electricity; a second workpiece that is made of a material that conducts electricity and has a plurality of projections formed therein; an area of the first workpiece is disposed at the plurality of projections; a material that has an electrical conductivity lower than the conductivity of the second workpiece and is disposed between each of the plurality of projections; and means for conducting electricity through the first workpiece and through at least one of the plurality of projections of the second workpiece.

The above described and other features are exemplified by the following figures and detailed description.

BRIEF DESCRIPTION OF THE DRAWINGS

Referring now to the figures, which are exemplary embodiments and wherein the like elements are numbered alike.

DETAILED DESCRIPTION

Figure 1:
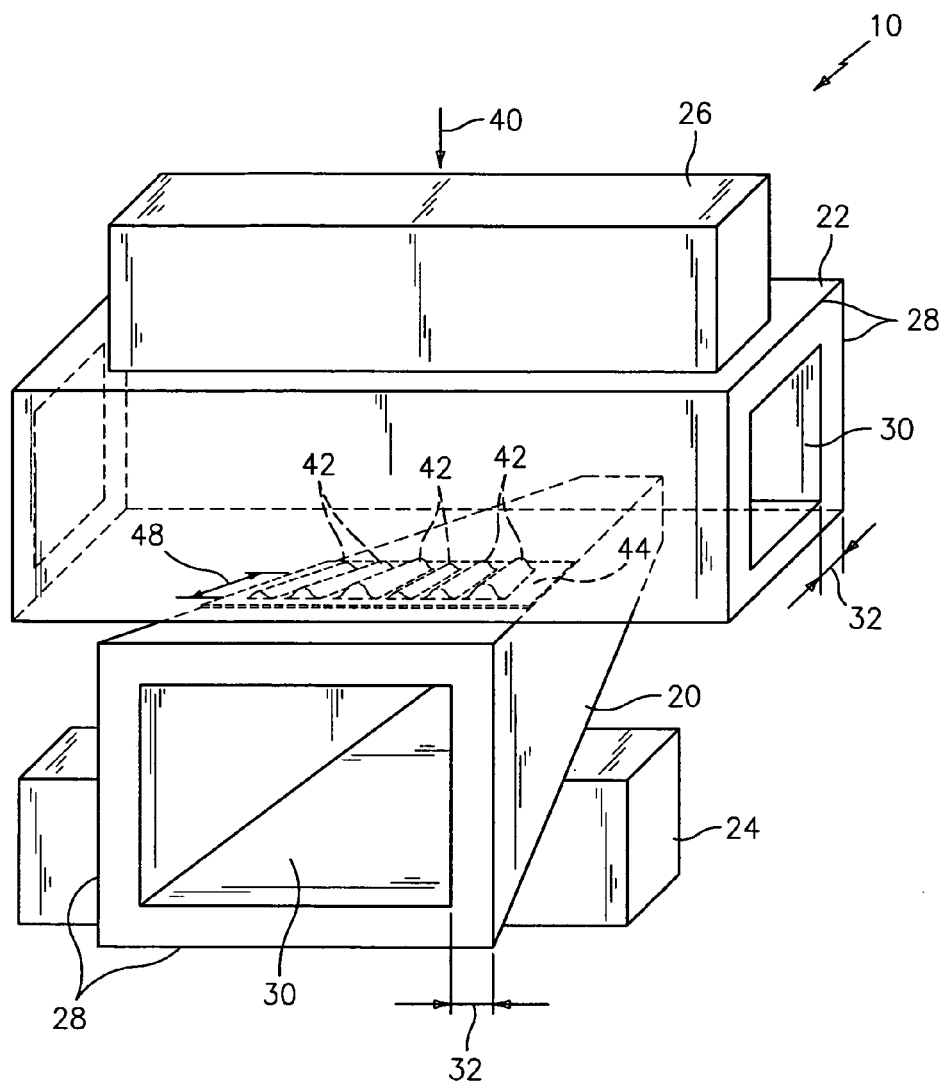
FIG. 1 is a front perspective view of a projection bond welding system before welding is initiated.

FIG. 1 illustrates a projection weld bonding system 10, which includes a first workpiece 20 and a second workpiece 22. It is contemplated that the workpieces can have a wide range of shapes and sizes. Workpieces 20 and 22 may be made of a wide range of materials, so long as the material conducts electricity. The workpiece 20 is connected to a first electrode 24 and the second workpiece 22 is connected to a second electrode 26.

In an exemplary embodiment, the two workpieces 20 and 22 are hydroformed tubes that include walls 28 forming the tube and a hollow section 30 in the center of the workpiece. Each wall 28 has a thickness 32 that is as thin as approximately 0.5 millimeters to as thick as approximately 8 millimeters.

In an exemplary embodiment, both electrodes 24 and 26 are made of material that conducts electricity and has good conductivity characteristics, such as copper. While the electrodes 24 and 26 are shown as bars, the electrodes 24 and 26 may be different shapes. The electrodes 24 and 26 may also apply a force to workpieces 20 and 22 and may be used to clamp the two workpieces 20 and 22 together. Electricity 40 flows from one workpiece to the other workpiece and is illustrated in FIG. 1 as flowing from workpiece 22 to workpiece 20. FIG. 1 illustrates the projection weld bond system 10, just before the electricity 40 begins to flow. While embodiments disclosed herein may depict electricity 40 flowing in one direction, such as in a DC (direct current) welding application for example, it will be appreciated that embodiments of the invention may also employ electricity 40 flowing in two directions, such as in an AC (alternating current) welding application for example.

One of the workpieces (in this case workpiece 20) is formed with a plurality of projections 42 formed in the workpiece 20. The projections 42 may be formed through any method suitable for the purpose. Examples of such methods include secondary sheet metal forming, a secondary coining operation, and hyrdroforming. For instance, when the workpiece 20 is formed, the hydroforming die may be modified so that the cavity of the die includes the projections, thereby forming the workpiece 20 with the projections 42. It is recognized that either workpiece could have the projections formed as part of the tube. The plurality of projections 42 are formed in a location of the workpiece 20 that will be joined to the workpiece 22.

Figure 2:
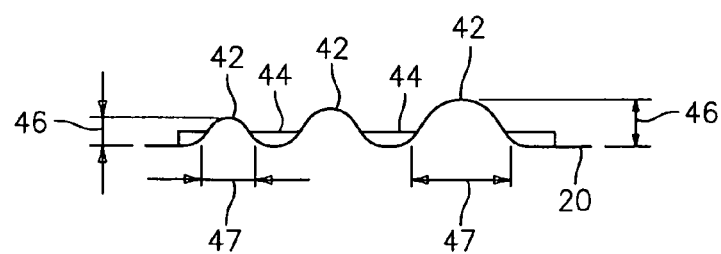
FIG. 2 is a close up view of the projections and insulating material on a workpiece of the projection bond welding system of FIG. 1.

Referring to FIGS. 1 and 2, projection weld bonding system 10 also includes a layer of a substance or material 44, which is located on the workpiece that has the projections 42. Alternatively, or in combination, the material 44 may be located on the opposite workpiece in an area not directly opposing the projections 42. In an embodiment, the total thickness of the material 44 is less than the height of the smallest projection 42. It is also understood that the terms "substance" and "material" are used interchangeably to reflect that it does not matter whether the layer is a substance or a material. Thus, when one term is used, the use of that term encompasses the other term. The material 44 has an electrical conductivity that is lower than first and second workpiece. In an embodiment, the material 44 may either have a low electrical conductivity or be electrically non-conductive.

In an exemplary embodiment, the material 44 is an adhesive so that it can be easily applied to the workpiece. Moreover, by using an adhesive, the adhesive supplements the joint in that the adhesives fills in the areas surrounding the welds, thereby enhancing the performance of the joint. In an embodiment, the material 44 is placed between each of the projections 42 and at the end of each of the projections so that the adhesive surrounds each projection. The material 44 may be applied by any method, such as through a nozzle, which directs the placement of the adhesive. In an exemplary embodiment, material 44 will be applied so as to be as thin as possible, to develop the maximum possible strength, but the initial application should be sufficiently thick to fill the largest gap or contour that naturally occurs on the surface of the workpiece. If excess material 44 has been applied to the workpiece, the excess material 44 may be extruded from the joint when the parts are fitted together. Moreover, the thickness of the layer of material 44 may vary slightly over the workpiece so that the material 44 may fill gaps or contours located on the surfaces of the workpiece.

The material 44 is used so that the electricity is first conducted through the projections, which is the path of least resistance. As such, the electrical current resists going through the area surrounding each of the projections. Material 44 is either minimally electrically conductive or non-conductive and therefore limits and/or prevents electricity from flowing through the area with the material 44. Examples of low electrically conductive materials include, but are not limited to, epoxy, most polymers, rubber, and PVC. In particular, exemplary material 44 includes M-BOND® 610 and Terokal 4555B.

Referring to FIG. 2, when the plurality of projections 42 are formed, each projection 42 is formed with a height 46 and a base width 47. In an exemplary embodiment, a first set of projections has a first height and a second set of projections has a second different height. It is understood that the first set of projections may include one, two, three, or more projections and that the second set of projections may include one, two, three, or more projections. It is also understood that while only two sets of projections are discussed specifically, the number of sets of projections may be more than two.

The same is also true of the base width 47 of the projections 42. In an exemplary embodiment, a first set of projections has a first base width and a second set of projections has a second different base width. It is understood that the first set of projections may include one, two, three, or more projections and that the second set of projections may include one, two, three, or more projections. It is also understood that while only two sets of projections are discussed specifically, the number of sets of projections may be more than two. In addition, while the figure illustrates the elongated projections with rounded cross-sections, the projection cross-section may be any shape that can be formed, such as pointed, hemi-spherical or square, for example.

The height 46 and base width 47 of the projections 42 are determined based on the thickness 32 of the workpiece 20, 22 in which the projection is formed. For instance, the thinner the thickness of the workpiece, the smaller the height and base of the projection. Alternatively, the thicker the thickness of the workpiece, the larger the height and base of the projection. In an exemplary embodiment, if the thickness 32 of the workpiece 20 is 0.7 millimeter, then the average height and base width of the projections 42 is 0.56 millimeter and 2.4 millimeter, respectively. Moreover, because the projections may have different heights, the range of the height 46 of the projections 42 is approximately 0.2 millimeter to approximately 1.0 millimeter. The base width 47 of the projections 42 can also vary and is approximately 0.8 to 10 mm.

In another exemplary embodiment, if the thickness 32 of the workpiece 20 is 3 millimeters, then the average height of the projections 42 is 1.4 millimeter and the range of the height 46 of the projections is 0.5 millimeter to 2.5 millimeter. The base width 47 of the projections 42 can also vary and is in the range of 2.0 to 10 mm. Moreover, while FIG. 2 illustrates the projections 42 as having a rounded cross-section, the cross-section of projections 42 can be any shape. Additional examples of size of heights and base widths of projections are set forth in the American Welding Society Handbook Guides.

Referring again to FIG. 1, each projection 42 has a length 48, which can vary. In an exemplary embodiment, the length 48 is the approximately 0.4 to 0.7 of the width of the workpiece that is being welded to the workpiece with the projections.

Figure 3:
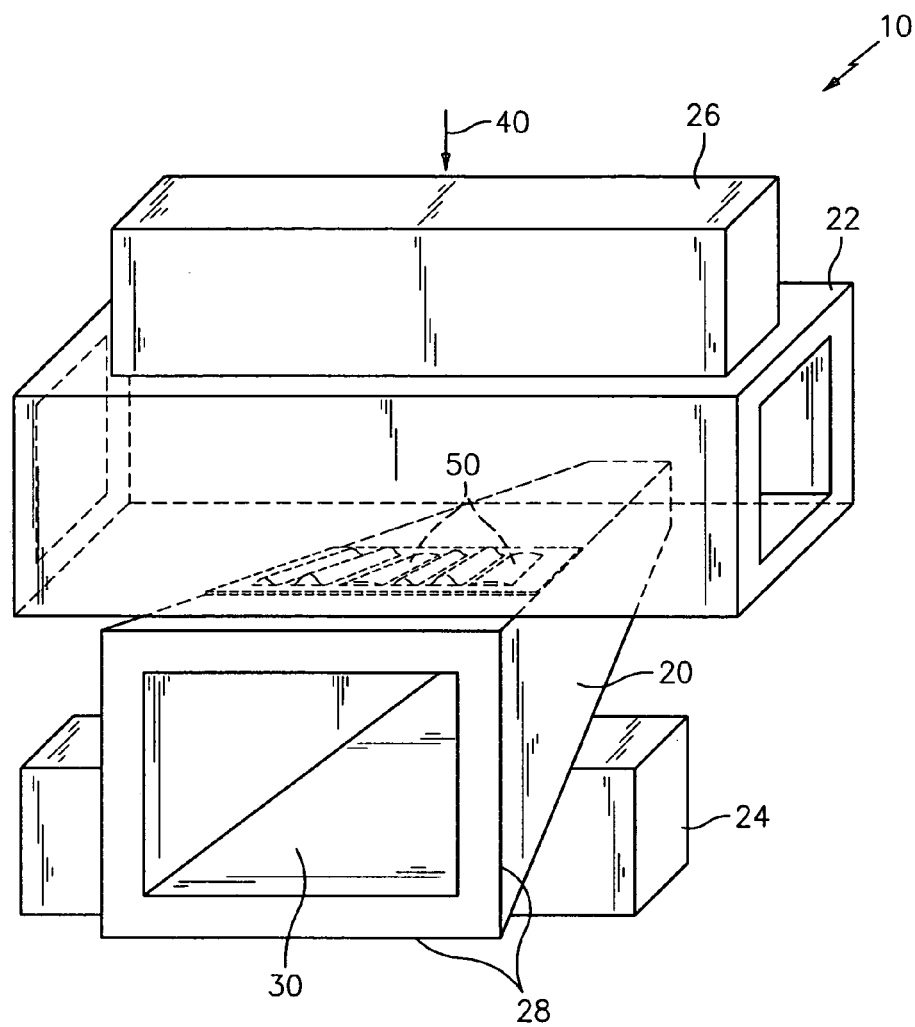
FIG. 3 is a front perspective view of the projection bond welding system after welding has begun.
Figure 4:
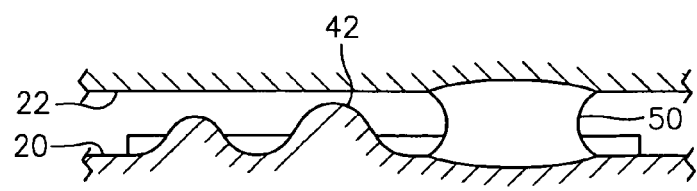
FIG. 4 is a close up view of the projections and insulating material on a workpiece of the projection bond welding system of FIG. 3.

Referring to FIGS. 3 and 4, the projection weld bonding system 10 is illustrated after initiating the electricity 40 through the system 10. Electricity (or current) 40 flows through electrode 26, workpiece 22, the largest projection(s) 42 (see FIG. 1), workpiece 20, and electrode 24. As electricity 40 continues to flow, heat is created at the largest projection 42 (see FIG. 1), which in turn melts the largest projection and creates a weld pool 50. The depicted shape of weld pool 50 is illustrative only and may be influenced by a plurality of material and/or welding parameters.

The plurality of projections 42 may also include projections 42 of different heights 46 and base widths 47, which allows the initial contact area between the two workpieces to remain small thereby limiting the areal extent of current flow and hence the total current while also restricting the size of the molten zone. When the projections 42 are different heights, then initially, there is only one projection that contacts the opposing workpiece. When the current flows through the workpieces, the current will go through the path of least resistance. As such, when projections are located at the contact area between the two workpieces, the current will flow through the projection with the largest height, as that is the area of contact and the path of least resistance. Because the contact area is only the area of the projection, the current flows through only this area, which heats up the metal at that projection, which causes the projection to melt and collapse, thereby developing a weld at the area of the projection. Moreover, because the area of contact is small, the projection heats up quickly. An exemplary embodiment of the invention also encompasses a first set of projections having a first height and/or base width and second set of projections having a second different height and/or base width.

Once the highest projection(s) has collapsed, the next highest projection(s) comes in contact with the opposing workpiece, which then causes the second projection(s) to melt. As such, the projections melt progressively. To ensure that each projection melts progressively, the weld current may be increased slightly to compensate for the contact area becoming larger. As a result, the slightly higher current will heat the metal at the projection to a point at which the projection melts and collapses.

The advantage of the projection weld bonding system 10 is that the system 10 is cheaper than laser beam welding and a large area can be welded or weld bonded. Projection weld bonding also produces a strong connection between two structures. In addition, because there is a smaller weld area, the projection weld bonding system 10 reduces energy consumption, reduces the transformer size, and prolongs the electrode life.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A method of welding comprising:
providing a first workpiece that is made of a material that conducts electricity;
providing a second workpiece that is made of a material that conducts electricity and has a plurality of projections formed therein, wherein a first set of said plurality of projections has a height and a second set of said plurality of projections has a different height;
applying a material between each projection of said plurality of projections, said material has an electrical conductivity that is lower than the conductivity of said second workpiece;
disposing an area of said first workpiece at said plurality of projections of said second workpiece; and
conducting electricity through said first worlcpiece and through at least one of said plurality of projections of said second workpiece.

2. The method of claim 1, further comprising melting said plurality of projections progressively.

3. The method of claim 1, wherein said height and said different height of each of said plurality of projections ranges from 0.2 millimetcr to 2.5 millimeter.

4. The method of claim 1, further comprising connecting a first electrode to said first workpiece and connecting a second electrode to said second workpiece.

5. The method of claim 1, wherein said first and second workpiece are formed by hydroforming.

6. The method of claim 1, further comprising said plurality of projections are formed by hydroforming.

7. The method of claim 1, wherein said material is an adhesive.

8. The method of claim 1, wherein said material is non-electrically conductive.

9. The method of claim 1, wherein said applying said material includes applying said material trough a nozzle.

10. The method of claim 1, wherein said first workpiece is hollow and has a first wall thickness and said second workpiece is hollow and has a second wall thickness.

11. The method of claim 1, wherein each of said plurality of projections has a length, said length ranges from 0.4 to 0.7 of a width of said first workpiece.

12. The method of claim 1, wherein each of said plurality of projections has a base width, said base width of each of said plurality of projections ranges from 0.8 to 10 millimeters.

13. The method of claim 1, wherein:
the first set of said plurality of projections has a base width and the second set of said plurality of projections has a different base width.

14. A projection weld bond system comprising:
a first workpiece that is made of a material that conducts electricity;
a second workpiece that is made of a material that conducts electricity and has a plurality of projections formed therein, wherein a first set of said plurality of projections has a height and a second set of said plurality of projections has a different height;
an area of said first workpiece is disposed at said plurality of projections;
a material that has an electrical conductivity lower than the conductivity of said second workpiece and is disposed between each of said plurality of projections; and
means for conducting electricity though said first warkpiece and through at least one of said plurality of projections of said second workpiece.

15. The system of claim 14, further comprising means for melting said plurality of projections progressively.

16. The system of claim 14, wherein said height and said different height of each of said plurality of projections ranges from 0.2 millimeter to 2.5 millimeter.

17. The system of claim 14, wherein said means for conducting includes a first electrode connected to said first workpiece and a second electrode connected to said second worlcpiece.

18. The system of claim 14, wherein said low electrically conductive material is an adhesive.

19. The system of claim 14, wherein said material is non-electrically conductive.

20. The system of claim 14, wherein each of said plurality of projections has a length, said length ranges from 0.4 to 0.7 of a width of said first workpiece.

21. The system of claim 14, wherein each of said plurality of projections has a base width, said base width of each of said plurality of projections ranges from 0.8 to 10 millimeters.

22. The system of claim 14, wherein:
the first set of said plurality of projections has a base width and the second set of said plurality of projections has a different base width.

* * * * *